United States Patent
Menezes et al.

(10) Patent No.: US 6,850,620 B2
(45) Date of Patent: Feb. 1, 2005

(54) METHOD FOR PREVENTING KEY SHARE ATTACKS

(75) Inventors: Alfred J. Menezes, Waterloo (CA); Simon Blake-Wilson, Toronto (CA)

(73) Assignee: Certicom Corp., Mississauga (CA)

( * ) Notice: Subject to any disclaimer, the term of this patent is extended or adjusted under 35 U.S.C. 154(b) by 543 days.

(21) Appl. No.: 09/745,488

(22) Filed: Dec. 26, 2000

(65) Prior Publication Data

US 2001/0021256 A1 Sep. 13, 2001

Related U.S. Application Data

(63) Continuation of application No. PCT/CA99/00595, filed on Jun. 28, 1999.

(30) Foreign Application Priority Data

Jun. 26, 1998 (CA) .............................................. 2241705

(51) Int. Cl.$^7$ ............................................... H04N 7/167
(52) U.S. Cl. ........................ 380/286; 380/283; 380/278
(58) Field of Search ................................. 380/286, 283, 380/278

(56) References Cited

U.S. PATENT DOCUMENTS 5,491,750 A  2/1996 Bellare et al.
6,212,636 B1 * 4/2001 Boyle et al. ................. 713/168
6,246,771 B1 * 6/2001 Stanton et al. ............... 380/286

FOREIGN PATENT DOCUMENTS

EP          0661844 A2    7/1995

OTHER PUBLICATIONS

Boyd, Colin et al., "Design and Analysis of Key Exchange Protocols via Secure Channel identification", 4th International Conference on the Theory and Application of Cryptology, Nov. 28, 1994, pp. 171–181, No. CONF. 4, Wollongong, Australia.

Diffie, Whitefield et al., "Authentication and Authenticated Key Exchanges", Designs, Codes and Cryptography, Jun. 1, 1992, pp. 107–125, vol. 2, No. 2, Kluwer Academic Publishers, Netherlands.

* cited by examiner

*Primary Examiner*—Thomas R. Peeso
(74) *Attorney, Agent, or Firm*—John R. S. Orange; Sean X. Zhang; Santosh K. Chari

(57) ABSTRACT

A key agreement protocol for preventing key-share attacks wherein a method is provided for establishing a common shared key between a pair of correspondents in a station-to-station protocol by exchanging messages between the correspondents and including identification information in said messages, the information being identifiable to one or other of said correspondents to thereby establish said common key.

7 Claims, 1 Drawing Sheet

METHOD FOR PREVENTING KEY SHARE ATTACKS

This application is a continuation of application No. PCT/CA99/00595, filed Jun. 28, 1999.

This invention relates to cryptographic systems and in particular, to improvements in key agreement protocols for preventing key-share attacks thereon.

BACKGROUND OF THE INVENTION

Key establishment is the process by which two (or more) entities establish a shared secret key.

The key is subsequently used to achieve some cryptographic goal, such as confidentiality or data integrity. Ideally, the established key should have precisely the same attributes as a key established face-to-face it should be distributed uniformly at random from the key space, and no unauthorized (and computationally bounded) entity should learn anything about the key.

Broadly speaking, there are two kinds of key establishment protocols: key transport protocols in which a key is created by one entity and securely transmitted to the second entity, and key agreement protocols in which both parties contribute information which jointly establish the shared secret key.

Let A and B be two honest entities, i.e., legitimate entities who execute the steps of a protocol correctly. Informally speaking, a key agreement protocol is said to provide implicit key authentication (of B to A) if entity A is assured that no other entity aside from a specifically identified second entity B can possibly learn the value of a particular secret key Note that the property of implicit key authentication does not necessarily mean that A is assured of B actually possessing the key. A key agreement protocol which provides implicit key authentication to both participating entities is called an authenticated key agreement (AK) protocol.

Informally speaking, a key agreement protocol is said to provide explicit key confirmation (of B to A) if entity A is assured that the second entity B has actually computed the agreed key. The protocol provides implicit key confirmation if A is assured that B can compute the agreed key. While explicit key confirmation appears to provide stronger assurances to A than implicit key confirmation (in particular, the former implies the latter), it is possible that, for all practical purposes, the assurances are in fact the same. This is because B may delete the key immediately after the explicit key confirmation process.

If both implicit key authentication and (implicit on explicit) key confirmation (of B to A) are provided, then the key establishment protocol is said to provide explicit key authentication (of B to A). A key agreement protocol which provides explicit key authentication to both participating entities is called an authenticated key agreement with key confirmation (AKC) protocol.

An unknown key-share (UKS) attack on an AK or AKC protocol is an attack whereby an entity A is coerced into sharing a key with an entity B without A's knowledge, i.e., when A believes the key is shared with some entity E≠B. Notice that if an AK or AKC protocol succumbs to a UKS attack, then this does not contradict the implicit key authentication property of the protocol. By definition, the provision of implicit key authentication is only considered in the case where A engages in the protocol with an honest entity (which E isn't).

The station-to-station (STS) protocol is a Diffie-Hellman-based AKC protocol that purports to provide both (mutual) implicit key authentication and (mutual) key confirmation, and additionally appears to possess desirable security attributes such as forward secrecy and key-compromise impersonation. There are two main variants of STS as described in W. Diffie et al., "Authentication and authenticated key exchanges", Designs, Codes and Cryptography, 2 (1992) 107–125. One in which key confirmation is provided by using the agreed key K in a MAC algorithm (STS-MAC), and another in which K is used in an encryption scheme (STS-ENC). STS-MAC is preferred over STS-ENC in many practical scenarios. Moreover, the use of encryption to provide key confirmation in STS-ENC is suspect—the goal of an encryption scheme is to provide confidentiality, rather than as an authentication mechanism for proving possession of a key. One advantage of STS-ENC over STS-MAC is that the former can facilitate the provision of anonymity.

Many protocols related to STS have appeared in the literature. It should be noted, however, that these protocols cannot be considered minor variants of STS.

For the sake of clarity, notation used in the specification, is initially outlined as follows:

| | |
|---|---|
| A, B | Honest entities. |
| E | The adversary. |
| $S_A$ | A's (private) signing key for a signature scheme S. |
| $P_A$ | A's (public) verification key for S. |
| $S_A(M)$ | A's signature on message M. |
| $Cert_a$ | A's certificate containing A's name. A's public signature key PA, and possibly some other information. |
| $E_K(M)$ | Encryption of M using a symmetric-key encryption scheme with key K |
| $MAC_K(M)$ | Message authentication code of M under key K. |
| G, α, n | Diffie-Hellman parameters; α is an element of prime order n in the finite group G. |
| $r_A$ | A's ephemeral Diffie-Hellman private key; $1 \leq r_A \leq n - 1$. |
| K | Ephemeral Diffie-Hellman shared secret, $K = \alpha^{r_A r_B}$ |

The two STS variants are presented below. In both descriptions, A is called the initiator, while B is called the responder.

STS-MAC protocol

The STS-MAC protocols is depicted below. Initiator A selects a random secret integer $r_A$, $1 \leq r_A \leq n-1$, and sends to B the message (1). Upon receiving (1), B selects a random secret integer $r_B$, $1 \leq r_B \leq n-1$, computes the shared secret $K=\alpha^{r_A r_B}$, and sends message (2) to A. Upon receiving (2), A uses $Cert_B$ to verify the authenticity of B's signing key $P_B$, verifies B's signature on the message ($\alpha^{r_B}$, $\alpha^{r_A}$), computes the shared secret K, and verifies the MAC on $S_B(\alpha^{r_B}, \alpha^{r_A})$ A then sends message (3) to B. Upon receipt of (3), B uses $Cert_A$ to verify the authenticity of A's signing key PA, verifies A's signature on the message ($\alpha^{r_A}$, $\alpha^{r_B}$) and verifies the MAC on $S_B(\alpha^{r_A}, \alpha^{r_B})$. If at any stage a check or verification performed by A or B fails, then that entity terminates the protocol run, and rejects.

(1) A→B A, $\alpha^{r_A}$ (2) A←B $Cert_B$, $\alpha^{r_B}$,($S_B(\alpha^{r_B},\alpha^{r_A})$,$MAC_K(S_B(\alpha^{r_B},\alpha^{r_A}))$ (3) A→B $Cert_A$, $S_A(\alpha^{r_A},\alpha^{r_B})$,$MAC_K(S_A(\alpha^{r_A},\alpha^{r_B}))$ STS-ENC protocol The STS-ENC protocol is given below. For the sake of brevity, the checks that should be performed by A and B are henceforth omitted.

(1) A→B A, $\alpha^{r_A}$ (2) A←B $Cert_B$, $\alpha^{r_B}$, $E_K(S_B(\alpha^{r_B},\alpha^{r_A}))$ (3) A→B $Cert_A$, $E_K(S_A(\alpha^{r_A},\alpha^{r_B}))$ In order to more clearly understand an unknown key-share (UKS) attack on a key agreement protocol, we consider a hypothetical scenario where a UKS attack can have damaging consequences. Suppose that A is a bank branch and B is an account holder. Certificates are issued by the bank headquarters and within each certificate is the account information of the holder. Suppose that the protocol for electronic deposit of funds is to exchange a key with a bank branch via an AKC protocol. At the conclusion of the protocol run, encrypted funds are deposited to the account number in the certificate. Suppose that no further authentication is done in the encrypted deposit message (which might be the case to save bandwidth). If the UKS attack mentioned above is successfully launched then the deposit will be made to E's account instead of B's account.

It is important to observe that a UKS attack on an AKC protocol is a much more serious consideration than a UKS attack on an AK protocol (which does not provide key confirmation).

No key agreed in an AK protocol should be used without key confirmation. Indeed, some standards take the conservative approach of mandating key confirmation of keys agreed in an AK protocol. If appropriate key confirmation is subsequently provided, then the attempt at a UKS attack will be detected. For this reason, the above hypothetical scenario (in particular, the assumption that no further authentication is performed after termination of the key agreement protocol) is realistic if an AKC protocol is used (since key confirmation has already been provided), an unrealistic if an AK protocol is used (since key confirmation has not yet been provided).

In a UKS attack against the responder, the adversary E registers A's public key PA as its own; i.e., $P_E=P_A$. When A sends B message (1), E intercepts it and replaces the identity A with E. E then passes message (2) from B to A unchanged. Finally E intercepts message (3), and replaces $Cert_A$ with $Cert_E$. Since $P_A=P_E$, we have $S_A(\alpha^{rA},\alpha^{rB})=S_E(\alpha^{rA},\alpha^{rB})$. Hence, B accepts the key K and believes that K is shared with E, while in fact it is shared with A. Note that E does not learn the value of K. The attack is depicted below. The notation A!→B means that A transmitted a message intended for B, which was intercepted by the adversary and not delivered to B.

(1) A!→B A,$\alpha^{rA}$ (1') E→B E, $\alpha^{rA}$ (2) E←B $Cert_B$, $\alpha^{rB}$,$S_B(\alpha^{rB},\alpha^{rA})$,$MAC_K(S_B(\alpha^{rB},\alpha^{rA}))$ (2') A←E $Cert_B$, $\alpha^{rB}$,$S_B(\alpha^{rB},\alpha^{rA})$,$MAC_K(S_B(\alpha^{rB},\alpha^{rA}))$ (3) A!→B $Cert_A$, $S_A(\alpha^{rB},\alpha^{rA})$,$MAC_K(S_A(\alpha^{rB},\alpha^{rA}))$ (3') E→B $Cert_A$, $S_A(\alpha^{rB},\alpha^{rA})$,$MAC_K(S_A(\alpha^{rB},\alpha^{rA}))$ Entity E can similarly launch a UKS attack against the initiator A by registering B's public key PB as its own. The attack is depicted below.

(1) A→E A,$\alpha^{rA}$ (1') E→B A, $\alpha^{rA}$ (2) A←!B $Cert_B$, $\alpha^{rB}$,$S_B(\alpha^{rB},\alpha^{rA})$,$MAC_K(S_B(\alpha^{rB},\alpha^{rA}))$ (2') A←E $Cert_E$, $\alpha^{rB}$,$S_B(\alpha^{rB},\alpha^{rA})$,$MAC_K(S_B(\alpha^{rB},\alpha^{rA}))$ (3) A→E $Cert_A$, $S_A(\alpha^{rB},\alpha^{rA})$,$MAC_K(S_A(\alpha^{rB},\alpha^{rA}))$ (3') E→B $Cert_A$, $S_A(\alpha^{rB},\alpha^{rA})$,$MAC_K(S_A(\alpha^{rB},\alpha^{rA}))$ In describing new on-line UKS attacks we make the following assumptions. First, we assume that the signature scheme S used in STS has the following duplicate-signature key selection property. Suppose that $P_A$ (A's public key), and A's signature sA on a message M are known. Then the adversary is able to select a key pair $(P_E, S_E)$ with respect to which $s_A$ is also E's signature on the message M.

Second, E is able to get its public key certified during a run of the STS protocol. This assumption is plausible, for instance, in situations where delays in the transmission of messages are normal, and where the CA is on-line.

This new UKS attack against the responder is similar to the public key substitution attack against the responder as described earlier. After A sends message (3), E intercepts it and selects a key pair $(P_E,S_E)$ for the employed signature scheme such that $S_E(\alpha^{rA},\alpha^{rB})=S_A(\alpha^{rA},\alpha^{rB})$. E then obtains a certificate $Cert_E$ for $P_E$, and transmits message (3') to B.

This new UKS attack against the initiator is similar to the public key substitution attack against the initiator described above. After B sends message (2), E intercepts it and selects a key pair (PE; SE) for the employed signature scheme such that $S_E$ $S_B(\alpha^{rB},\alpha^{rA})=S_B(\alpha^{rB},\alpha^{rA})$. E then obtains a certificate $Cert_E$ for $P_E$, and transmits message (2') to A.

In the on-line UKS attacks, the adversary knows the private key SE corresponding to its chosen public key $P_E$. Hence, unlike the case of public key substitution attacks, the on-line attacks cannot be prevented by requiring that entities prove to the certificate-issuing authority possession of the private keys corresponding to their public keys during the certification process.

The applicants have discovered that the STS protocols have some security attributes that are lacking. It is, thus desirable to implement a STS protocol wherein unknown key-share attacks are minimized.

SUMMARY OF THE INVENTION

According to a general aspect of the invention there is provided in a key agreement protocol the steps of including the identities of the sender and intended receiver as well as a flow number in the message being signed to thereby prevent an on-line UKS attack.

According to one aspect of the invention, there is provided in an STS-MAC protocol, including one of the entities A sending its certificate $Cert_A$ in a first flow to thereby minimize an on-line UKS attack against a responder B.

According to a further aspect of the invention, there is provided the step of implicit, rather than explicit, key confirmation.

A still further aspect of the invention provides for including the identities of the entities in the key derivation function, rather than the signed message.

A further feature of the invention provides for the application thereof to STS-ENC and STS-MAC protocols.

BRIEF DESCRIPTION OF THE DRAWINGS

These and other features of the preferred embodiments of the invention will become more apparent in the following detailed description in which reference is made to the appended drawings wherein.

DETAILED DESCRIPTION OF A PREFERRED EMBODIMENT

Figure 1:
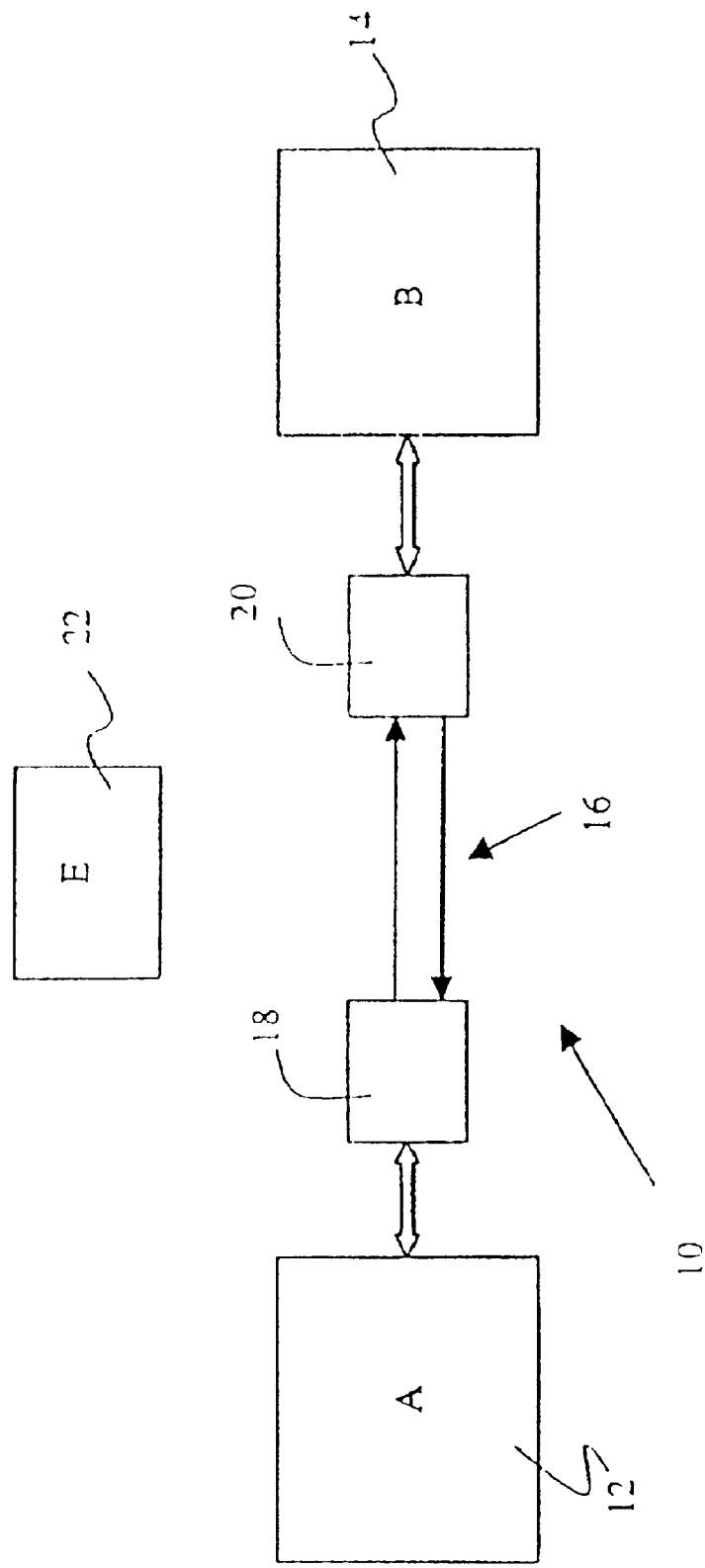
FIG. 1 is a schematic diagram of a data communication system.

Referring to FIG. 1, an electronic communication system 10 includes a pair of correspondents, A and B, designated as a sender 12 and recipient 14, connected by a communication channel 16. Each of the correspondents 12 and 14 includes an encryption unit 18 and 20 respectively that may process information and prepare it for transmission through the channel 16. A third entity 22 is depicted as the adversary.

In a key establishment/agreement protocol, according to the embodiment of the present invention, the following flow of messages take place between the entities:

Item 1.

(1) A→E $A, \alpha^{rA}$ (2) A←B $\text{Cert}_B, \alpha^{rB}, S_B(2,B,A,\alpha^{rB},\alpha^{rA}), \text{MAC}_K(S_B(2,B,A,\alpha^{rB},\alpha^{rA}))$ (3) A→B $\text{Cert}_A, S_A(3,A,B,\alpha^{rA},\alpha^{rB}), \text{MAC}_K(S_A(3,A,B,\alpha^{rA},\alpha^{rB}))$ In the original STS-MAC protocol described in the background section and the modification presented above, the agreed key K is used as the MAC key for the purpose of providing explicit key confirmation. A passive adversary now has some information about K, namely the MAC of a known message under K. The adversary can use this to distinguish K from a key selected uniformly at random from the key space 1. The key space here is $K=\{\alpha^i : 1 \leq i \leq n-1\}$. Another drawback of providing explicit key confirmation in this way is that the agreed key K may be subsequently used with a different cryptographic primitive than the MAC algorithm | this violates a fundamental cryptographic principle that a key should not be used for more than one purpose.

Two ways of achieving implicit, rather than explicit, key confirmation are:

(i) derive two keys $K\|K'=H(\alpha^{rArB})$ from the same shared secret (here H is a cryptographic hash function); and (ii) derive two keys $K'=H_1(\alpha^{rArB})$ and $K=H_2(\alpha^{rArB})$ where $H_1$ and $H_2$ are independent random oracles[2].

K' is used as the MAC key for the session, while K is used as the agreed session key. The revised protocol is depicted below.

Item 2.

(1) A→B $A, \alpha^{rA}$ (2) A←B $\text{Cert}_B, \alpha^{rB}, S_B(2,B,A,\alpha^{rB},\alpha^{rA}), \text{MAC}_{K'}(S_B(2,B,A,\alpha^{rB},\alpha^{rA}))$ (3) A→B $\text{Cert}_A, S_A(3,A,B,\alpha^{rA},\alpha^{rB}), \text{MAC}_{K'}(S_A(3,A,B,\alpha^{rA},\alpha^{rB}))$ Instead of including the identities of the entities in the signed message, one could include them in the key derivation function, whose purpose is to derive the shared key from the shared secret $\alpha^{rArB}$. In the protocol of item 1, the shared secret key would be $K=H(\alpha^{rArB}, A, B)$, while in the two protocols of item 2, the shared keys would be $K\|K'=H(\alpha^{rArB}, A, B)$ and (ii) $K'=H_1(\alpha^{rArB}, A, B)$ and $K'=H_2(\alpha^{rArB}, A, B)$ However, key derivation functions have not been well-studied by the cryptographic community the desirable properties of a key derivation function have not yet been specified. Hence the protocols presented in items 1. and 2. are preferred over the variants which include identities in the key derivation function.

The protocols in item 2 provide implicit key confirmation. While the assurance that the other entity has actually computed the shared key K is not provided, each entity does get the assurance that the other has computed the shared secret $\alpha^{rArB}$. Implicit key confirmation is still provided (to a somewhat lesser degree) if the MACs are not included in the flows. The revised protocol is shown below:

Item 3.

(1) A→B $A, \alpha^{rA}$ (2) A←B $\text{Cert}_B, \alpha^{rB}, S_B(2,B,A,\alpha^{rB},\alpha^{rA})$ (3) A→B $\text{Cert}_A, S_A(3,A,B,\alpha^{rA},\alpha^{rB})$ The on-line UKS attacks cannot be launched on STS-ENC because the signatures $S_A(\alpha^{rA},\alpha^{rB})$ and $S_B(\alpha^{rB},\alpha^{rA})$ are not known by the adversary. However, as a precautionary measure, we recommend that STS-ENC be modified so that the flow number and identities of the sender and intended recipient be included in the signed messages or that the identities be included in the key derivation function above.

Although the invention has been described with reference to certain specific embodiments, various modifications thereof will be apparent to those skilled in the art without departing from the spirit and scope of the invention as outlined in the claims appended hereto. For example, the items are described with respect to the STS-MAC they can equally well be defined with respect to the STS-ENC. Furthermore, they can be utilized over other groups such as elliptic curve groups.

The embodiments of the invention in which an exclusive property or privilege is claimed are defined as follows:

1. A method of establishing a common shared key between a pair of correspondents, said method comprising the steps of exchanging a pair of messages between the correspondents with one message from each of the correspondents, each of the messages having a portion signed by a sender and including the identity of the intended recipient said sender and intended recipient thereby being identifiable to one or other of said correspondents to thereby establish said common key between intended parties.

2. A method as defined in claim 1, including the steps of providing in said signed portion a flow number.

3. A method as defined in claim 1, said step of exchanging messages being based on a STS-MAC Protocol.

4. A method as defined in claim 3, including the step of transmitting the sender's certificate in a first flow to thereby minimize an on-line UKS attack against a recipient.

5. A method as defined in claim 1, including the step of providing the identities of the correspondents in a key derivation function rather than a signed message.

6. A method as defined in claim 1, said exchange of messages being based on an STS-ENC Protocol.

7. A method as defined in claim 1, said exchange of messages being based on an STS-MAC Protocol.

* * * * *